United States Patent
Chase et al.

(10) Patent No.: US 9,755,989 B2
(45) Date of Patent: *Sep. 5, 2017

(54) RESOURCE-AWARE SYSTEM, METHOD AND PROGRAM PRODUCT FOR MANAGING REQUEST TRAFFIC BASED ON A MANAGEMENT POLICY

(71) Applicant: International Business Machines Corporation, Armonk, NY (US)

(72) Inventors: Jeffrey S. Chase, Durham, NC (US); Ronald P. Doyle, Raleigh, NC (US); David L. Kaminsky, Chapel Hill, NC (US); David M. Ogle, Cary, NC (US); Richard D. Telford, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 93 days.

This patent is subject to a terminal disclaimer.

(21) Appl. No.: 14/509,333

(22) Filed: Oct. 8, 2014

(65) Prior Publication Data
US 2015/0026350 A1 Jan. 22, 2015

Related U.S. Application Data

(60) Continuation of application No. 13/113,882, filed on May 23, 2011, now Pat. No. 8,873,390, which is a
(Continued)

(51) Int. Cl.
*H04L 12/911* (2013.01)
*H04L 12/26* (2006.01)
*H04L 12/24* (2006.01)

(52) U.S. Cl.
CPC .......... *H04L 47/70* (2013.01); *H04L 12/2602* (2013.01); *H04L 41/14* (2013.01);
(Continued)

(58) Field of Classification Search
CPC ..... H04L 47/70; H04L 41/14; H04L 41/5025; H04L 12/2602; H04L 43/00; H04L 41/0893; H04L 43/16; H04L 41/0816
See application file for complete search history.

(56) References Cited

U.S. PATENT DOCUMENTS

| 5,008,882 A | * | 4/1991 | Peterson ........... G06F 15/17368 370/406 |
| 5,031,089 A | | 7/1991 | Liu et al. |

(Continued)

FOREIGN PATENT DOCUMENTS

| EP | 0 366 344 A | 5/1990 |
| EP | 1 211 600 A | 6/2002 |

(Continued)

OTHER PUBLICATIONS

Information Materials for IDS, Apr. 27, 2009, Prepared by: Hiroaki Mikami, Japanese Patent Office.
(Continued)

*Primary Examiner* — Christopher Grey
(74) *Attorney, Agent, or Firm* — Steven M. Greenberg, Esq.; CRGO Law (57) ABSTRACT

Under the present invention, the performance of a set of system resources is monitored in response to incoming request traffic. When a system resource is approaching an overload condition, a corrective action is identified and implemented. Overload thresholds for each system resource and appropriate corrective actions are contained within a management policy. Based on a performance history of the corrective actions, the management policy can be changed/revised.

19 Claims, 3 Drawing Sheets

Related U.S. Application Data division of application No. 10/315,339, filed on Dec. 10, 2002, now Pat. No. 7,986,625.

(52) U.S. Cl.
CPC .......... *H04L 41/5025* (2013.01); *H04L 43/00* (2013.01); *H04L 41/0816* (2013.01); *H04L 41/0893* (2013.01); *H04L 43/16* (2013.01)

(56) References Cited

U.S. PATENT DOCUMENTS

| | | | |
|---|---|---|---|
| 5,426,736 A | | 6/1995 | Guineau, III |
| 5,440,741 A | * | 8/1995 | Morales .................. G06F 9/505 |
| | | | 718/103 |
| 5,446,874 A | | 8/1995 | Waclawsky et al. |
| 5,878,224 A | * | 3/1999 | Smith ..................... H04L 47/10 |
| | | | 709/224 |
| 5,936,939 A | | 8/1999 | Des Jardins et al. |
| 5,938,749 A | | 8/1999 | Rusu et al. |
| 5,943,232 A | * | 8/1999 | Gehi ..................... G06F 9/5083 |
| | | | 370/231 |
| 5,974,457 A | | 10/1999 | Waclawsky et al. |
| 6,097,597 A | | 8/2000 | Kobayashi |
| 6,141,323 A | | 10/2000 | Rusu et al. |
| 6,230,152 B1 | | 5/2001 | Barone |
| 6,237,059 B1 | | 5/2001 | Dean et al. |
| 6,259,698 B1 | | 7/2001 | Shin et al. |
| 6,333,917 B1 | | 12/2001 | Lyon et al. |
| 6,442,139 B1 | | 8/2002 | Hosein |
| 2003/0097443 A1 | * | 5/2003 | Gillett ..................... H04L 29/06 |
| | | | 709/225 |
| 2004/0203441 A1 | * | 10/2004 | Smith ..................... H04W 24/00 |
| | | | 455/67.11 |
| 2004/0264377 A1 | * | 12/2004 | Kilkki ..................... H04L 47/10 |
| | | | 370/235 |

FOREIGN PATENT DOCUMENTS

| | | | |
|---|---|---|---|
| JP | 1097510 A | 4/1989 | |
| JP | 5216842 A | 8/1993 | |
| JP | 7152700 A | 6/1995 | |
| JP | 2002223223 A | 8/2002 | |
| JP | 2002351852 A | 12/2002 | |

OTHER PUBLICATIONS

Youran Lan, et al: "A Dynamic Central Scheduler Load Balancing Mechanism", Computers and Communications, 1995, Conference Proceedings of the 1995 IEEE Fourteenth Annual International Phoenix Conference in Scottsdale, AZ,IEEE, US, Mar. 28, 1995, pp. 734-740, XP010149418.

Hailperin M: "Load Balancing for Massively-Parallel Soft-Real-Time Systems", Frontiers of Massively Parallel Computation, 1988, Proceedings . . . $2^{nd}$ Symposium on the Frontiers of Fairfax, VA., USA Oct. 10-12, 1998, Washington, DC. IEEE Computer Soc. PR. Oct. 10, 1988, pp. 159-163, XP010033014.

Alonso, Rafael, et al: "Sharing Jobs Among Independently Owned Processors", Distributed Computing systems, 1988, $8^{th}$ International Conference in San Jose, CA, Jun. 13-17, 1998, pp. 282-288, XP010013097.

Jian Xu, et al: "Heuristic Methods for Dynamic Load Balancing in a Message-Passing Multicomputer", Journal of Parallel and Distributed Computing, Academic Press, Duluth, MN, vol. 18, No. 1, May 1, 1993, pp. 1-13, XP000377670.

Winckler, A..: "Scheduling of Near-Future Workload in Distributed Computing Systems", Proceedings of the Region Ten Conference (Tencon), Beijing, Oct. 19-21, 1993. vol. 3, pp. 169-172, XP010113482.

Chao-Ju Hou, et al: "Load Sharing with Consideration of Future Task Arrivals in Heterogeneous Distributed Real-Time Systems", IEEE Transactions on Computers, IEEE Inc. New York, vol. 43, No. 9, pp. 1076-1090, XP000461782.

Goswami, K. K. et al: "Prediction-Based Dynamic Load-Sharing Heuristics", IEEE Transactions on Parallel and Distributed Systems, IEEE Inc, New York, vol. 4, No. 6, Jun. 1, 1993, pp. 638-648, XP000398046.

Loukas et al., "Fuzzy RED: Congestion control for TCP/IP Diff-Serv," date and source unknown.

"Policing and Shaping," www.lightreading.com—The Global Site for Optical Networking, Nov. 15, 2000.

\* cited by examiner

RESOURCE-AWARE SYSTEM, METHOD AND PROGRAM PRODUCT FOR MANAGING REQUEST TRAFFIC BASED ON A MANAGEMENT POLICY

CROSS-REFERENCE TO RELATED APPLICATION

This application is a Continuation of U.S. application Ser. No. 13/113,882, filed May 23, 2011, now allowed, which is a Divisional of U.S. application Ser. No. 10/315,339, filed on Dec. 10, 2002, now U.S. Pat. No. 7,986,625, which are both incorporated herein by reference in their entirety.

BACKGROUND OF THE INVENTION

1. Field of the Invention

In general, the present invention provides a system, method and program product for managing request traffic based on a management policy. Specifically, the present invention provides management of request traffic based on the performance of system resources in response to the request traffic.

2. Background Art

As computer technology continues to advance, the extent to which business and individuals rely on computer systems and networks in everyday life becomes more prevalent. For example, today a computer user can order goods/services or obtain information from the convenience of his/her computer. Internally, many businesses currently utilize computer networks to interconnect various departments and individuals. Tasks which were previously performed manually, or not at all, are now performed utilizing the computing resources of the business. For example, instead of manually searching books and files for information, a worker can conduct a search for needed information from his/her desktop computer. However, this increased use of computing resources often leads to a "pressure buildup" within the system. Specifically, as request traffic increases, the strain of processing the requests can cause a drain on server-side resources. Such a drain often leads to system failure such as the dropping of data packets, refusal of network connections, etc.

Heretofore, many attempts have been made to alleviate such system resource overload. One approach was to prioritize request traffic based on classes/types of requests. For example, requests were grouped into classes such as "gold" and "silver." The "gold" requests were then given priority over the "silver" requests. However, this approach only increased the strain on the system when the "gold" requests were causing the overload conditions to begin with. For example, if the "gold" requests were for accessing storage resources, and the storage resources were approaching overload conditions, giving increased priority to the "gold" requests would only further push the storage resources to overload.

Another previous attempt to avoid system resource overload involved slowing all request traffic down, regardless of request class. This was generally accomplished by queuing all incoming requests. Unfortunately, this approach is extremely inefficient and could unnecessarily slow the entire system. For example, if "silver" requests were not adversely affecting the system to begin with, slowing the "silver" requests would only unnecessarily slow the system and frustrate the users. Accordingly, not only do previous attempts fail to manage request traffic based on performance of the system resources, but the previous attempts also fail to adjust their approach when a certain corrective action is ineffective.

In view of the foregoing, there exists a need for a resource-aware system, method and program product for managing request traffic based on a management policy. Specifically, a need exists for a system that manages request traffic based on specific resources that are approaching overload conditions. A further need exists for a performance of system resources to be monitored in response to request traffic, and based on a management policy, corrective actions to be taken when a system resource is approaching overload conditions. An additional need exists for the management policy to be changed based on a performance history of implemented corrective actions.

SUMMARY OF THE INVENTION

In general, the present invention provides a resource-aware system, method and program product for managing request traffic based on a management policy. Specifically, under the present invention, the performance of a set (i.e., one or more) of system resources is monitored in response to request traffic. When a particular system resource is approaching an overload condition, a corrective action is identified from the management policy and then implemented. The corrective action is typically identified based on the system resource that is approaching overload so that an appropriate and effective corrective action will be implemented. The management policy can be changed under the present invention to account for performance histories of the corrective actions. This allows ineffective corrective actions to be discarded and new corrective actions to be implemented.

According to a first aspect of the present invention, a resource-aware system for managing request traffic based on a management policy is provided. The system comprises: (1) an analyzer system for monitoring a performance of a set of system resources in response to the request traffic, and for determining when at least one of the set of system resources is approaching an overload condition based on the management policy; and (2) a planning system for identifying a corrective action to avoid the overload condition, wherein the corrective action is identified based on the at least one system resource that is approaching the overload condition and the management policy.

According to a second aspect of the present invention, a resource-aware method for managing request traffic based on a management policy is provided. The system comprises: (1) receiving the request traffic; (2) monitoring a performance of a set of system resources in response to the request traffic; (3) determining when at least one of the set of system resources is approaching an overload condition based on the management policy; and (4) identifying a corrective action to avoid the overload condition based on the at least one system resource that is approaching the overload condition and the management policy.

According to a third aspect of the present invention, a program product stored on a recordable medium for managing request traffic based on a management policy is provided. When executed, the program product comprises: (1) program code for monitoring performance of a set of system resources in response to incoming request traffic, and for determining when at least one of the set of system resources is approaching an overload condition based on the management policy; and (2) program code for identifying and implementing a corrective action to avoid the overload condition, wherein the corrective action is identified based on the at least one system resource that is approaching the overload condition and the management policy.

Therefore, the present invention provides a resource-aware system, method and program product for managing request traffic based on a management policy.

BRIEF DESCRIPTION OF THE DRAWINGS

These and other features of this invention will be more readily understood from the following detailed description of the various aspects of the invention taken in conjunction with the accompanying drawings in which.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a resource-aware system, method and program product for managing request traffic based on a management policy. Specifically, under the present invention a performance of a set (i.e., one or more) of system resources is monitored in response to request traffic. When a particular system resource is approaching an overload condition, a corrective action is identified from the management policy and then implemented. The corrective action is typically identified based on the system resource that is approaching overload so that an appropriate and effective corrective action will be implemented. The management policy can be changed under the present invention to account for performance histories of the corrective actions. This allows ineffective corrective actions to be discarded and new corrective actions to be implemented.

Figure 1:
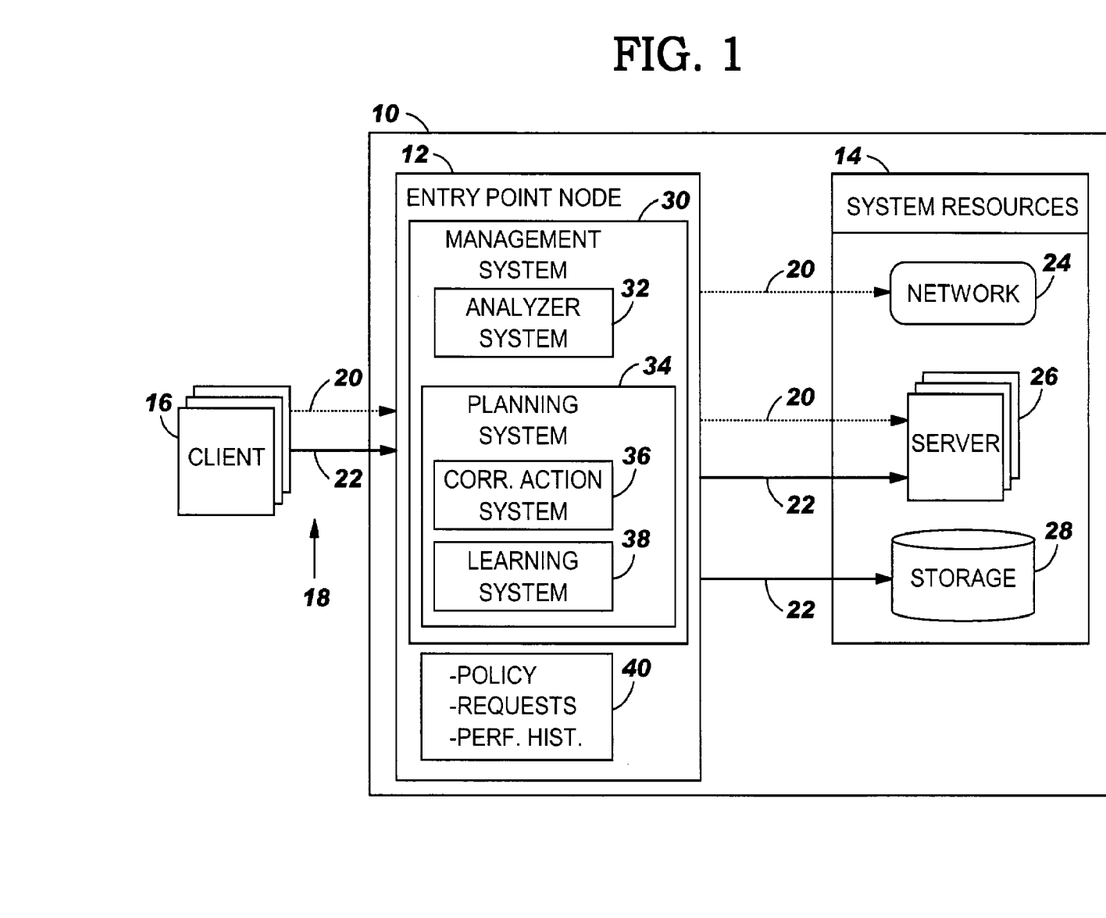
FIG. 1 depicts a resource-aware system for managing request traffic based on a management policy according to the present invention.

Referring now to FIG. 1, a resource-aware system for managing request traffic 18 based on a management policy is shown. Specifically, request traffic 18 is received from clients 16 by enterprise system 10. As shown, enterprise system 10 generally includes entry point node 12 and system resources 14. Enterprise system 10 is intended to represent any type of computer infrastructure that can process requests from clients 16. For example, enterprise system 10 could be the internal computing infrastructure use by a retail company. To this extent, clients 16 are intended to represent any system capable of generating and transmitting requests to enterprise system 10. For example, clients 16 could be web users attempting to order goods from the retail company. Alternatively, clients 16 could be employees of the retail company attempting to perform work-related tasks. Entry point node 12 is intended to represent any node that receives and routes incoming request traffic 18 among system resources 14. For example, entry point node 12 could be a load balancer, a request router, etc. As shown, system resources 14 generally include a network 12, one or more servers 26 and one or more storage units 28. It should be understood, however, that such system resources are shown for illustrative purposes only and that the teachings of the present invention could be implemented with any type and/or quantity of system resources.

Shown loaded on entry point node 12 is management system 30. As depicted, management system includes analyzer system 32, planning system 34 that includes corrective action system 36 and learning system 38, and storage system 40. Storage system 40 could be local (as shown) or remote and provides storage for information under the present invention. Such information could include, among other things, a management policy, a record of requests received, performance history of corrective actions, etc. Among other things, the management policy sets forth an overload threshold for each of the system resources 14. That is, the management policy will identify the point at which a system resource will be overloaded and possibly fail. The management policy will also identify a corresponding corrective action to be taken to avoid the overload condition.

Under the present invention, as request traffic 18 is received, analyzer system 32 of management system 30 will continuously monitor the performances of system resources 14. The monitoring is to see how system resources 14 are handling the various requests 20 and 22 in traffic 18. As shown in FIG. 1, requests 20 and 22 could be for any purpose. For example, requests 20 and 22 could be to access or perform some task over network 24, to access one or more servers 26, to access information in one or more storage units 28, etc. In monitoring system resources 14, any standard now known or later developed could be utilized. In a typical embodiment, the management policy will specify precisely how performance of a system resource should be monitored and measured. For example, network 24 performance could be monitored based on how many active connections exist. In this case, analyzer system 32 will continuously monitor the number of active network connections, and compare that number to an overload threshold (e.g., 1000 active connections) for network 24 as set forth in the management policy. If the number of connections is approaching an overload threshold as indicated in the policy, analyzer system 32 will communicate that information to planning system 34. To this extent, the management policy could include a set of threshold rules such as "when the number of connections to network 24 is equal to 1000 out of 1100 possible connections, inform planning system 34 to avoid overload." Analyzer system 32 can also check storage system 40 to see what actions were previously taken to address the overload condition and whether they were successful. As will be further described below, a performance history of the corrective actions can be recorded so that ineffective corrective actions can be discarded. In any event, analyzer system 32 could communicate this information to planning system 34. A similar approach can be used to monitor servers 26 and storage units 28. With respect to servers 26, performance could be monitored based on, for example, a number of tasks a server is currently being requested to perform. With respect to storage units 28, performance could be monitored based on, for example, a quantity of information retrieval requests a storage unit 28 is processing at any one time.

If a particular system resource is approaching its overload threshold, corrective action system 36 will receive the information transmitted from analyzer system 32 and reference the management policy to identify and implement the most appropriate corrective action. Unlike previous systems, the corrective action is resource-based in that the requests that are causing the specific overload condition will be targeted. For example, if request 20 is of a certain type that primarily utilizes network 24, and network 24 is approaching its overload threshold, the corrective action will address requests 20 and will likely leave requests 22 alone. Conversely, if one of storage units 28 is approaching its overload threshold, the corrective action will likely address requests 22 as opposed to requests 20. Thus, the present invention can allow innocuous traffic to continue, thereby helping system performance without worsening system "pressure."

In a typical embodiment, there are several types of corrective actions that can be implemented. The first type is to change a queue priority of requests 18 based on the type of request and what system resource is approaching the overload condition. For example, as shown, requests 20 are the type that primarily "task" network 24 and servers 26. Thus, if network 24 is approaching an overloaded condition, requests 20 will be given a lower queue priority so that fewer requests for network 24 connections are received and network 24 will not approach or exceed its overload threshold. Changing the queue priority of requests 20 may or may not lead to an increased priority of requests 22. If the altering of queue priority fails to remedy the overload condition, corrective action system 36 can take the more drastic action of discarding or excluding the requests causing the problems. Accordingly, if network 24 is approaching an overload condition, and changing the queue priority of requests 20 fails to remedy the problem, requests 20 can be excluded entirely so that overload does not occur. The exclusion will be followed by the transmission of a message describing the exclusion to the sending client 16. A third type of corrective action could be implemented based on the consumption of resources per request type, as monitored by analyzer system 32. For example, assume that each request 20 requires server 26 to perform an average of two tasks and a maximum of four. Further assume that each request 22 requires that server 26 perform an average of ten requests and a maximum of fifty. In this example, if server 26 is determined to be approaching an overload condition, corrective action system 36 could receive the consumption information from analyzer system 32 and "intelligently" decide to limit requests 22, but not requests 20. The "intelligence" for such a limitation could be provided as one or more rules in the management policy.

In performing any corrective action, the management policy could optionally set forth a bottom threshold for returning to "normal" status. For example, if the overload threshold for network 24 is 1000 connections, the management policy could also state that once the number of connections falls below 800, corrective action system 36 will cease implementing the corrective actions (until the overload threshold of 1000 connections is approached again). As indicated above, analyzer system 32 is continuously monitoring the performances of system resources 14. Any relevant information will be communicated to planning system 34 and used by corrective action system 36. Thus, if the queue priority of requests 20 was made lower to avoid crossing the overload threshold of network 24, the queue priority could be returned to normal when the number of network connections returns to "normal" levels (e.g., falls below the bottom threshold).

Learning system 38 of planning system 34 can dynamically change/amend the management policy based on the performance histories of the corrective actions. For example, if the queue priority of requests 20 are made lower in an attempt to avoid overloading of network 24, learning system 38 can change the management policy based on whether the lowering of the queue priority actually helped avoid overloading. To this extent, learning system 38 could use continuous monitoring information received from analyzer system 32. If it appears that the implemented corrective action is not helping to avoid overload conditions, learning system 38 will make a record of such in storage system 40 and change the management policy to reflect the failure. Changing of the management policy could be done in any manner. Examples include inserting a specific rule such as "do not adjust queue policy of requests 20 when attempting to avoiding overloading of network 24," or a broader change such as entirely eliminating queue priority changes as a corrective action.

Figure 2:
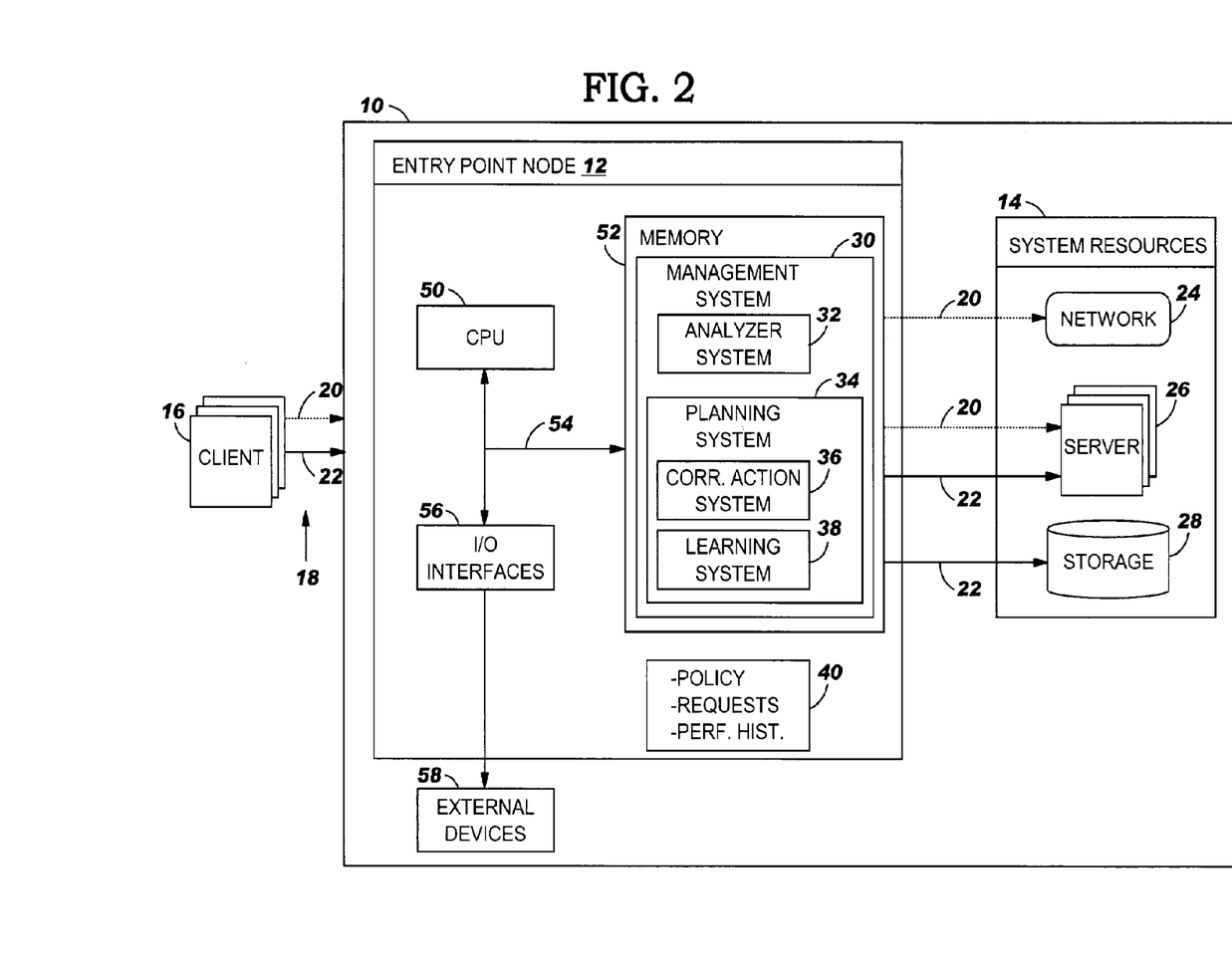
FIG. 2 depicts more detailed diagram of the system of FIG. 1.

Referring now to FIG. 2, a more detailed diagram of entry point node 12 is shown. As depicted, entry point node 12 generally includes central processing unit (CPU) 50, memory 52, bus 54, input/output (I/O) interfaces 56 and external devices/resources 58. CPU 50 may comprise a single processing unit, or be distributed across one or more processing units in one or more locations, e.g., on a client and server. Memory 52 may comprise any known type of data storage and/or transmission media, including magnetic media, optical media, random access memory (RAM), read-only memory (ROM), a data cache, a data object, etc. Moreover, similar to CPU 50, memory 52 may reside at a single physical location, comprising one or more types of data storage, or be distributed across a plurality of physical systems in various forms.

I/O interfaces 56 may comprise any system for exchanging information to/from an external source. External devices/resources 58 may comprise any known type of external device, including speakers, a CRT, LED screen, hand-held device, keyboard, mouse, voice recognition system, speech output system, printer, monitor, facsimile, pager, etc. Bus 54 provides a communication link between each of the components in entry point node 12 and likewise may comprise any known type of transmission link, including electrical, optical, wireless, etc. In addition, although not shown, additional components, such as cache memory, communication systems, system software, etc., may be incorporated into entry point node 12.

As indicated above, entry point node 12 could include storage system 40 which can be local (as shown) or remote. To this extent, storage system 40 may include one or more storage devices, such as a magnetic disk drive or an optical disk drive. In another embodiment, storage system 40 includes data distributed across, for example, a local area network (LAN), wide area network (WAN) or a storage area network (SAN) (not shown). storage system 40 may also be configured in such a way that one of ordinary skill in the art may interpret it to include one or more storage devices.

It should be understood that communication between clients 16 and entry point node 12 can occur via a direct hardwired connection (e.g., serial port), or via an addressable connection in a client-server (or server-server) environment (as shown) which may utilize any combination of wireline and/or wireless transmission methods. In the case of the latter, the server and client may be connected via the Internet, a wide area network (WAN), a local area network (LAN), a virtual private network (VPN) or other private network. The server and client may utilize conventional network connectivity, such as Token Ring, Ethernet, WiFi or other conventional communications standards. Where the client communicates with the server via the Internet, connectivity could be provided by conventional TCP/IP sockets-based protocol. In this instance, the client would utilize an Internet service provider to establish connectivity to the server.

Stored in memory 52 of entry point node 12 is management system 30 program product. As shown, management system 30 includes analyzer system 32 and planning system 34, which itself includes corrective action system 36 and learning system 38. As indicated above, analyzer system 32 will continuously monitor the performances of system resources 14. Based on the management policy, analyzer system 32 will determine when a particular system resource (e.g., network, server 26, or storage unit 28) is approaching an overload condition. If an overload condition is being approached (as dictated by thresholds or rules in the management policy), analyzer system 32 will reference storage system 40 to determine what corrective actions were previously performed, and whether they were successful. Analyzer system 32 will then communicate this information to planning system 34. Upon receipt, corrective action system 36 will identify and implement appropriate corrective actions based on what system resource 14 is approaching an overload condition, and the management policy. Specifically, the management policy contains additional rules that dictate what corrective actions should be implemented to remedy specific overload conditions. Thus, for example, if network 24 is approaching an overload condition, the management policy could dictate that the queue priority of requests 20 should be lowered. As indicated above, if changing the queue priority does not work, other corrective actions such as excluding requests 20 all together could be implemented. Still yet, corrective action could be implemented based of the consumption of resources per request type. This is so that, for example, if requests 20 and requests 22 are both received by server 26, corrective action system 36 could limit either requests 20 or requests 22 based on which type consumes the most resources.

In any event, if the overload condition is avoided, corrective action system 36 could cease implementing the corrective action if the performance of the overloaded system resource (i.e., as continuously monitored by analyzer system 32) returns to a "normal" level. As corrective actions are implemented, learning system 38 will dynamically change the management policy to reflect the performance history thereof. This allows ineffective corrective actions to be removed from the management policy to prevent making futile efforts in the future, and increase the efficiency of the system accordingly.

Figure 3:
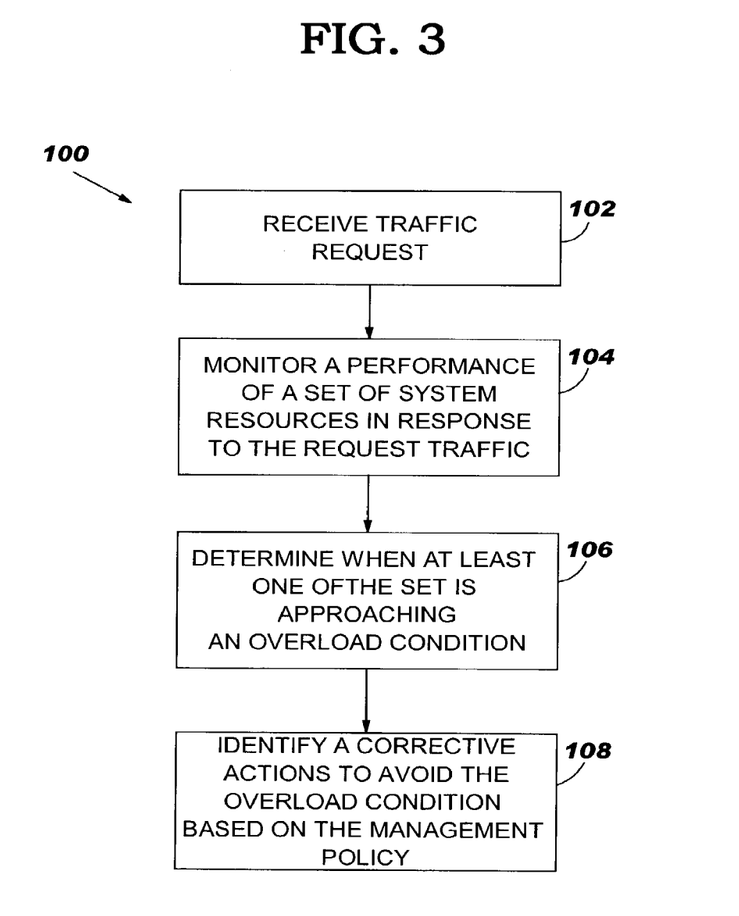
FIG. 3 depicts a method flow diagram according to the present invention.

Referring now to FIG. 3, a flow diagram of method 100 according to the present invention is shown. Request traffic is received in step 102. In step 104, the performance of a set of system resources is monitored in response to the request traffic. Based on the management policy, it is determined when at least one of the system resources is approaching an overload condition in step 106. Then, a corrective action to avoid the overload condition is identified and implemented in step 108. As indicated above, the corrective action is identified based on the particular system resource that is approaching overload condition, and the management policy.

It is understood that the present invention can be realized in hardware, software, or a combination of hardware and software. Any kind of computer/server system(s)—or other apparatus adapted for carrying out the methods described herein—is suited. A typical combination of hardware and software could be a general purpose computer system with a computer program that, when loaded and executed, controls entry point node 12 such that it carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims. For example, although learning system 38 has been shown as part of planning system 34, it could actually be implemented as a separate system.

We claim:

1. A method for increasing the efficiency of a resource-aware system, the method comprising:
    handling request traffic, the handling including:
    receiving request traffic,
    monitoring a performance of a set of system resources in response to the request traffic,
    determining when at least one of the set of system resources is approaching an overload threshold based on a management policy defining the overload threshold for each one of the set of system resources and a corresponding corrective action for each one of the set of system resources,
    identifying in the management policy a corrective action to avoid crossing the overload threshold based on the at least one system resource that is approaching the overload threshold,
    determining whether the identified corrective action previously had been unsuccessful in avoiding crossing of the overload threshold,
    on condition that the identified corrective action has been successful, implementing the identified corrective action so as to avoid crossing the overload threshold and,
    on condition that the identified corrective action has been unsuccessful, discarding the identified corrective action in favor of a different identified corrective action;
    recording a performance history of the corrective action; and,
    amending the management policy based on the performance history of the identified corrective action.

2. The method of claim 1, wherein amending the management policy based on the performance history of the correction action comprises:
    identifying that the corrective action fails to avoid overloading;
    making a record that the corrective action fails to avoid overloading; and,
    changing the management policy to reflect the failure of the corrective action.

3. The method of claim 2, wherein changing the management policy to reflect the failure of the corrective action comprises inserting a rule into the management policy.

4. The method of claim 2, wherein changing the management policy to reflect the failure of the corrective action comprises eliminating the corrective action from the management policy.

5. The method of claim 1, further comprising:
continuously monitoring information received about the corrective action.

6. The method of claim 1, further comprising:
determining whether the corrective action was previously performed;
determining whether the corrective action was successful upon determining that the corrective action was previously performed; and,
forwarding information regarding whether the corrective action was successful.

7. A resource-aware system, comprising:
a computer with memory and at least one processor;
a planning system executing in the memory of the computer, the planning system handling request traffic, the handling including:
receiving request traffic,
monitoring a performance of a set of system resources in response to the request traffic,
determining when at least one of the set of system resources is approaching an overload threshold based on a management policy defining the overload threshold for each one of the set of system resources and a corresponding corrective action for each one of the set of system resources,
identifying in the management policy a corrective action to avoid crossing the overload threshold based on the at least one system resource that is approaching the overload threshold,
determining whether the identified corrective action previously had been unsuccessful in avoiding crossing of the overload threshold,
on condition that the identified corrective action has been successful, implementing the identified corrective action so as to avoid crossing the overload threshold and,
on condition that the identified corrective action has been unsuccessful, discarding the identified corrective action in favor of a different identified corrective action;
an analyzer system executing in the memory of the computer, the system comprising program code enabled upon execution in the memory of the computer to record a performance history of the identified corrective action; and,
the program code of the planning system further amending the management policy based on the performance history of the identified corrective action.

8. The resource-aware system of claim 7, wherein the planning system further comprises a learning system.

9. The resource-aware system of claim 7, wherein program code of the planning system to amend the management policy based on the performance history of the correction action comprises program code:
to identify that the corrective action fails to avoid overloading;
to make a record that the corrective action fails to avoid overloading; and,
to change the management policy to reflect the failure of the corrective action.

10. The resource-aware system of claim 9, wherein program code of the planning system to change the management policy to reflect the failure of the corrective action comprises program code to insert a rule into the management policy.

11. The resource-aware system of claim 9, wherein the program code of the planning system to change the management policy to reflect the failure of the corrective action comprises program code to eliminate the corrective action from the management policy.

12. The resource-aware system of claim 7, wherein the planning system further comprises program code to continuously monitoring information received about the corrective action.

13. The resource-aware system of claim 7, wherein the analyzer system further comprises program code:
to determine whether the corrective action was previously performed by referencing a storage system;
to determine whether the corrective action was successful upon determining that the corrective action was previously performed; and,
to forward information regarding whether the corrective action was successful to the planning system.

14. A computer program product comprising a non-transitory computer usable storage device having stored therein computer usable program code for increasing the efficiency of a resource-aware system, the computer usable program code, which when executed by a computer hardware system causes the computer hardware system to perform:
handling request traffic, the handling including:
receiving request traffic,
monitoring a performance of a set of system resources in response to the request traffic, determining when at least one of the set of system resources is approaching an overload threshold based on a management policy defining the overload threshold for each one of the set of system resources and a corresponding corrective action for each one of the set of system resources,
identifying in the management policy a corrective action to avoid crossing the overload threshold based on the at least one system resource that is approaching the overload threshold,
determining whether the identified corrective action previously had been unsuccessful in avoiding crossing of the overload threshold,
on condition that the identified corrective action has been successful, implementing the identified corrective action so as to avoid crossing the overload threshold and,
on condition that the identified corrective action has been unsuccessful, discarding the identified corrective action in favor of a different identified corrective action;
recording a performance history of the corrective action; and,
amending the management policy based on the performance history of the identified corrective action.

15. The computer program product of claim 14, wherein the computer usable program code for amending the management policy based on the performance history of the correction action comprises:
computer usable program code for identifying that the corrective action fails to avoid overloading;
computer usable program code for making a record that the corrective action fails to avoid overloading; and,
computer usable program code for changing the management policy to reflect the failure of the corrective action.

16. The computer program product of claim 15, wherein the computer usable program code for changing the management policy to reflect the failure of the corrective action comprises computer usable program code for inserting a rule into the management policy.

17. The computer program product of claim 15, wherein the computer usable program code for changing the management policy to reflect the failure of the corrective action comprises computer usable program code for eliminating the corrective action from the management policy.

18. The computer program product of claim 14, further comprising computer readable program code for continuously monitoring information received about the corrective action.

19. The computer program product of claim 14, further comprising:
- computer readable program code for determining whether the corrective action was previously performed;
- computer readable program code for determining whether the corrective action was successful upon determining that the corrective action was previously performed; and,
- computer readable program code for forwarding information regarding whether the corrective action was successful.

* * * * *